(12) United States Patent
Stephens et al.

(10) Patent No.: US 11,656,315 B2
(45) Date of Patent: May 23, 2023

(54) SYSTEM AND METHOD FOR ULTRAWIDEBAND POSITION LOCATION

(71) Applicant: XCO TECH INC., Penticton (CA)

(72) Inventors: Scott Stephens, Carefree, AZ (US); Scott Mcmillan, Penticton (CA); Maik Wolleben, Naramata (CA)

(73) Assignee: XCO Tech Inc, Penticton (CA)

( * ) Notice: Subject to any disclaimer, the term of this patent is extended or adjusted under 35 U.S.C. 154(b) by 295 days.

(21) Appl. No.: 15/771,215

(22) PCT Filed: Nov. 10, 2016

(86) PCT No.: PCT/CA2016/051309
§ 371 (c)(1),
(2) Date: May 1, 2018

(87) PCT Pub. No.: WO2017/079839
PCT Pub. Date: May 18, 2017

(65) Prior Publication Data
US 2020/0041603 A1    Feb. 6, 2020

Related U.S. Application Data

(60) Provisional application No. 62/253,609, filed on Nov. 10, 2015.

(51) Int. Cl.
*G01S 3/50*    (2006.01)
*G01S 5/04*    (2006.01)
(Continued)

(52) U.S. Cl.
CPC .................. *G01S 3/50* (2013.01); *G01S 5/04* (2013.01); *G01S 5/12* (2013.01); *G01S 13/0209* (2013.01); *G01S 13/878* (2013.01)

(58) Field of Classification Search
CPC ..... G01S 5/04; G01S 5/12; G01S 3/50; G01S 13/0209; G01S 13/878; G01S 3/48; A61B 2034/2051
See application file for complete search history.

(56) References Cited

U.S. PATENT DOCUMENTS

| 4,057,803 A | * | 11/1977 | Coleman | G01S 3/48 342/446 |
| 5,583,517 A | * | 12/1996 | Yokev | G01S 5/04 342/457 |

(Continued)

FOREIGN PATENT DOCUMENTS

| CN | 102017296 B | * | 11/2013 | ............ H01Q 21/28 |
| WO | WO 2015/010734 A1 | | 1/2015 | |

OTHER PUBLICATIONS

Q. Li, Multiuser Detection for DS-CDMA UWB in the Home Environment, IEEE Journal on Selected Areas in Communications, vol. 20(9), p. 1701-1711, Dec. 2002 (Year: 2002).*
(Continued)

*Primary Examiner* — Bernarr E Gregory
*Assistant Examiner* — Fred H Mull
(74) *Attorney, Agent, or Firm* — Larson & Anderson, LLC

(57) ABSTRACT

A system and method can determine the position of a tag antenna relative to a plurality of spaced apart fixed base antennae using ultrawideband signals by using an angle of arrival determined by time of arrival of an ultrawideband signal from the tag antenna to disambiguate a differential phase angle of arrival measured from the differential phase of the ultrawideband signal between the two base antennae. Accordingly, a non-ambiguous phase angle of arrival of the ultrawideband signal from the tag antenna may be used with a range of the tag antenna measured by one or more methods including by 2-way time of flight, to determine the position (Continued)

of the tag antenna relative to the base antennae. The system and method can also use a plurality of pairs of antennae to determine a 3D position of the tag antenna.

21 Claims, 5 Drawing Sheets

(51) Int. Cl.
G01S 5/12 (2006.01)
G01S 13/02 (2006.01)
G01S 13/87 (2006.01)

(56) References Cited

U.S. PATENT DOCUMENTS

| | | | | |
|---|---|---|---|---|
| 5,724,047 | A * | 3/1998 | Lioio | G01S 3/50 342/417 |
| 6,239,747 | B1 * | 5/2001 | Kaminski | G01S 3/46 342/147 |
| 6,459,903 | B1 | 10/2002 | Lee | |
| 8,116,350 | B1 * | 2/2012 | Arndt | G01S 5/04 375/267 |
| 2006/0279454 | A1 * | 12/2006 | Schober | G01S 3/48 342/146 |
| 2008/0204322 | A1 * | 8/2008 | Oswald | G01S 5/04 342/465 |
| 2008/0316105 | A1 * | 12/2008 | Seong | G01S 5/12 342/442 |
| 2016/0105761 | A1 * | 4/2016 | Polo | G01S 5/0247 455/41.2 |
| 2016/0178727 | A1 * | 6/2016 | Bottazzi | G01S 5/12 375/130 |
| 2016/0270691 | A1 * | 9/2016 | Yu | G01S 13/0209 |

OTHER PUBLICATIONS

H. Harada, Multivalued Transmission System for UWB-CDMA Using Modified Hermite Pulse Shape, IEEE Topical Conference on Wireless Communication Technology, p. 451-452, 2003 (Year: 2003).*

C. Drane et al., Positioning GSM telephones, IEEE Communications Magazine, vol. 36(4), p. 46-54, 59, Apr. 1998 (Year: 1998).*

English translation of CN 102017296 B (Year: 2021).*

Extended European Search Report for corresponding European patent application serial No. EP 16 86 3272.

* cited by examiner

SYSTEM AND METHOD FOR ULTRAWIDEBAND POSITION LOCATION

1. CROSS REFERENCE TO RELATED APPLICATIONS

This application is related and claims priority to U.S. Provisional Patent Application Ser. No. 62/253,609 filed Nov. 10, 2015 and entitled "System and Method for Ultrawideband Position Location", which is hereby incorporated herein by reference in its entirety for all purposes.

2. TECHNICAL FIELD

The present disclosure relates generally to systems and methods for position location such as of a tag. More specifically, the present disclosure relates to a system and method for ultrawideband (UWB) position location using phase and time angle of arrival of a UWB tracking signal.

3. BACKGROUND OF THE INVENTION

The ability to remotely determine the position and to track movement of objects, animals or people using wireless positioning and tracking systems has become increasingly widespread and desired for use in a wide range of applications. However, many known wireless positioning and tracking systems and methods suffer from limitations including cost, size of equipment, accuracy, range and degradation from environmental interference, particularly in environments filled with obstacles or indoors.

Some positioning and tracking systems reliant upon very long range tracking signals, such as global positioning system (GPS) and related Galileo or GLONASS systems based on transmission of tracking signals from satellite stations, may suffer from reduced effectiveness and accuracy in sheltered or indoor environments not conducive to reception of satellite based signals, for example. Other primarily short range positioning and tracking systems such as those based on existing wireless data communication signal systems such as WiFi, Bluetooth™ and Zigbee™ based systems may suffer from degradation due to environmental interference in crowded or obstacle filled areas, and from limited range due to the use of wireless data communication systems designed primarily for data transmission rather than positioning or tracking.

Position tracking systems based on ultrawideband (UWB) wireless signal transmission have been developed which use the relatively precise time measurement provided by UWB pulse signals and associated receivers to provide positioning and tracking based on measuring time of flight of UWB signals between tracking antennae and tag antennae attached to an object, animal or person to be tracked. However, such UWB time of flight based systems may typically be limited in the accuracy and/or precision of positioning possible due to the ultimate limitations in time measurement accuracy and precision of the pulsed UWB signals.

Accordingly, in view of the above, a need exists for improved systems and methods to provide for position location and tracking of objects using UWB wireless transmission that may desirably provide for improving at least one of positioning accuracy, precision, error correction, flexibility and cost effectiveness.

4. SUMMARY OF THE INVENTION

It is an object of the present invention to provide a system and method for UWB position location that addresses some of the limitations of the prior art.

Another object of the present invention is to provide a system and method for UWB position location that allows for improved angle of arrival determination, and is compatible with new and existing methods for determining range of an object in the determination of its position.

It is a further object of the invention to provide a system and method for UWB position location that desirably provides for implementation using desirably cost effective, compact and low power integrated UWB transceiver solutions available from existing suppliers, such as the DW1000 integrated UWB radio available from DecaWave of Dublin Ireland, for example.

According to an embodiment of the present invention a method for determining the position of a tag antenna relative to a plurality of spaced apart fixed base antennae is provided. In such an embodiment, the method comprises the steps of:

measuring a phase and time of arrival of an ultrawideband signal transmitted by the tag antenna at a first base antenna and a second base antenna;

determining a differential phase of arrival of the ultrawideband signal between the first base antenna and the second base antenna using the phase of arrival;

determining a differential time of arrival of the ultrawideband signal between the first base antenna and the second base antenna using the time of arrival;

determining a time angle of arrival of the ultrawideband signal using the differential time of arrival;

determining an ambiguous differential phase angle of arrival beam and disambiguating the differential phase angle of arrival beam using the time angle of arrival to determine a phase angle of arrival of the ultrawideband signal; and determining a location of the tag antenna relative to the base antennae using the phase angle of arrival and a range of the tag antenna.

In a particular embodiment of the invention, the method may additionally comprise measuring a phase and time of arrival of an ultrawideband signal transmitted by the tag antenna for each of a plurality of pairs of first and second base antennae; and determining the differential phase of arrival, differential time of arrival, time angle of arrival and phase angle of arrival for each of the plurality of pairs of base antennae; and determining a location of the tag antenna relative to the plurality of pairs of base antennae using the phase angle of arrival and range of the tag antenna for each of the respective pairs of base antennae. In one such embodiment, determining the location of the tag antenna may comprise determining a three dimensional (or 3D) location of the tag antenna relative to each of two or more pairs of first and second base antennae, using the phase angle of arrival and range of the tag antenna for each of the two or more pairs of first and second base antennae. In an exemplary such embodiment, three base antennae elements may be used in combination as two or three pairs of antenna elements, to determine a 3D location of the tag antenna using the phase angle of arrival and range of the tag antenna for each of the two or three pairs of antenna elements. In another embodiment, determining the location of the tag antenna may comprise determining an aggregation or average of a plurality of determined locations using the phase angle of arrival and range for each of the two or more respective pairs of base antennae.

In one embodiment of the present invention, a non-transitory computer readable medium stores instructions, which, when executed by a computer, cause the computer to perform a method of UWB position location comprising:

measuring a phase and time of arrival of an ultrawideband signal transmitted by the tag antenna at a first base antenna and a second base antenna;

determining a differential phase of arrival of the ultrawideband signal between the first base antenna and the second base antenna using the phase of arrival;

determining a differential time of arrival of the ultrawideband signal between the first base antenna and the second base antenna using the time of arrival;

determining a time angle of arrival of the ultrawideband signal using the differential time of arrival;

determining an ambiguous differential phase angle of arrival beam and disambiguating the differential phase angle of arrival beam using the time angle of arrival to determine a phase angle of arrival of the ultrawideband signal; and determining a location of the tag antenna relative to the base antennae using the phase angle of arrival and a range of the tag antenna.

In a particular embodiment of the invention, the method of UWB position location may additionally comprise measuring a phase and time of arrival of an ultrawideband signal transmitted by the tag antenna for each of a plurality of pairs of first and second base antennae; and determining the differential phase of arrival, differential time of arrival, time angle of arrival and phase angle of arrival for each of the plurality of pairs of base antennae; and determining a location of the tag antenna relative to the plurality of pairs of base antennae using the phase angle of arrival and range of the tag antenna for each of the respective pairs of base antennae. In one such embodiment, determining the location of the tag antenna may comprise determining a three dimensional (or 3D) location of the tag antenna relative to each of two or more pairs of first and second base antennae, using the phase angle of arrival and range of the tag antenna for each of the two or more pairs of first and second base antennae. In an exemplary such embodiment, three base antennae elements may be used in combination as two or three pairs of antenna elements, to determine a 3D location of the tag antenna using the phase angle of arrival and range of the tag antenna for each of the two or three pairs of antenna elements. In another embodiment, determining the location of the tag antenna may comprise determining an aggregation or average of a plurality of determined locations using the phase angle of arrival and range for each of the two or more respective pairs of base antennae.

According to a further embodiment of the invention, a system for determining the position of a tag antenna relative to a plurality of spaced apart fixed base antennae is provided. In such embodiment, the system comprises:

a first base antenna comprising a first antenna element and a second base antenna comprising a second antenna element spaced apart from said first antenna element;

an ultrawideband receiver connected to the first and second base antennae and configured to receive an ultrawideband signal from the tag antenna from each of the first and second base antennae;

a processor connected to the ultrawideband receiver and operable to execute computer executable instructions stored on a non-transitory medium to configure the processor to:

measure a phase and time of arrival of an ultrawideband signal at the first base antenna and a second base antenna;

determine a differential phase of arrival of the ultrawideband signal between the first base antenna and the second base antenna using the phase of arrival;

determine a differential time of arrival of the ultrawideband signal between the first base antenna and the second base antenna using the time of arrival;

determine a time angle of arrival of the ultrawideband signal using the differential time of arrival;

determine an ambiguous differential phase angle of arrival beam and disambiguate the differential phase angle of arrival beam using the time angle of arrival to determine a phase angle of arrival of the ultrawideband signal; and determine a location of the tag antenna relative to the base antennae using the phase angle of arrival and a range of the tag antenna.

In one such embodiment of the invention, the system may additionally comprise a plurality measuring a phase and time of arrival of an ultrawideband signal transmitted by the tag antenna for each of a plurality of pairs of first and second base antennae; and determining the differential phase of arrival, differential time of arrival, time angle of arrival and phase angle of arrival for each of the plurality of pairs of base antennae; and determining a location of the tag antenna relative to the plurality of pairs of base antennae using the phase angle of arrival and range of the tag antenna for each of the respective pairs of base antennae. In one such embodiment, determining the location of the tag antenna may comprise determining a three dimensional (or 3D) location of the tag antenna relative to each of two or more pairs of first and second base antennae, using the phase angle of arrival and range of the tag antenna for each of the two or more pairs of first and second base antennae. In one such embodiment, determining the location of the tag antenna may comprise determining a three dimensional (or 3D) location of the tag antenna relative to each of two or more pairs of first and second base antennae, using the phase angle of arrival and range of the tag antenna for each of the two or more pairs of first and second base antennae. In an exemplary such embodiment, three base antennae elements may be used in combination as two or three pairs of antenna elements, to determine a 3D location of the tag antenna using the phase angle of arrival and range of the tag antenna for each of the two or three pairs of antenna elements. In another embodiment, determining the location of the tag antenna may comprise determining an aggregation or average of a plurality of determined locations using the phase angle of arrival and range for each of the two or more respective pairs of base antennae.

Further advantages of the invention will become apparent when considering the drawings in conjunction with the detailed description.

5. BRIEF DESCRIPTION OF THE DRAWINGS

The system and method of the present invention will now be described with reference to the accompanying drawing figures, in which.

Like reference numerals refer to corresponding parts throughout the several views of the drawings.

6. DETAILED DESCRIPTION OF THE INVENTION

Figure 1:
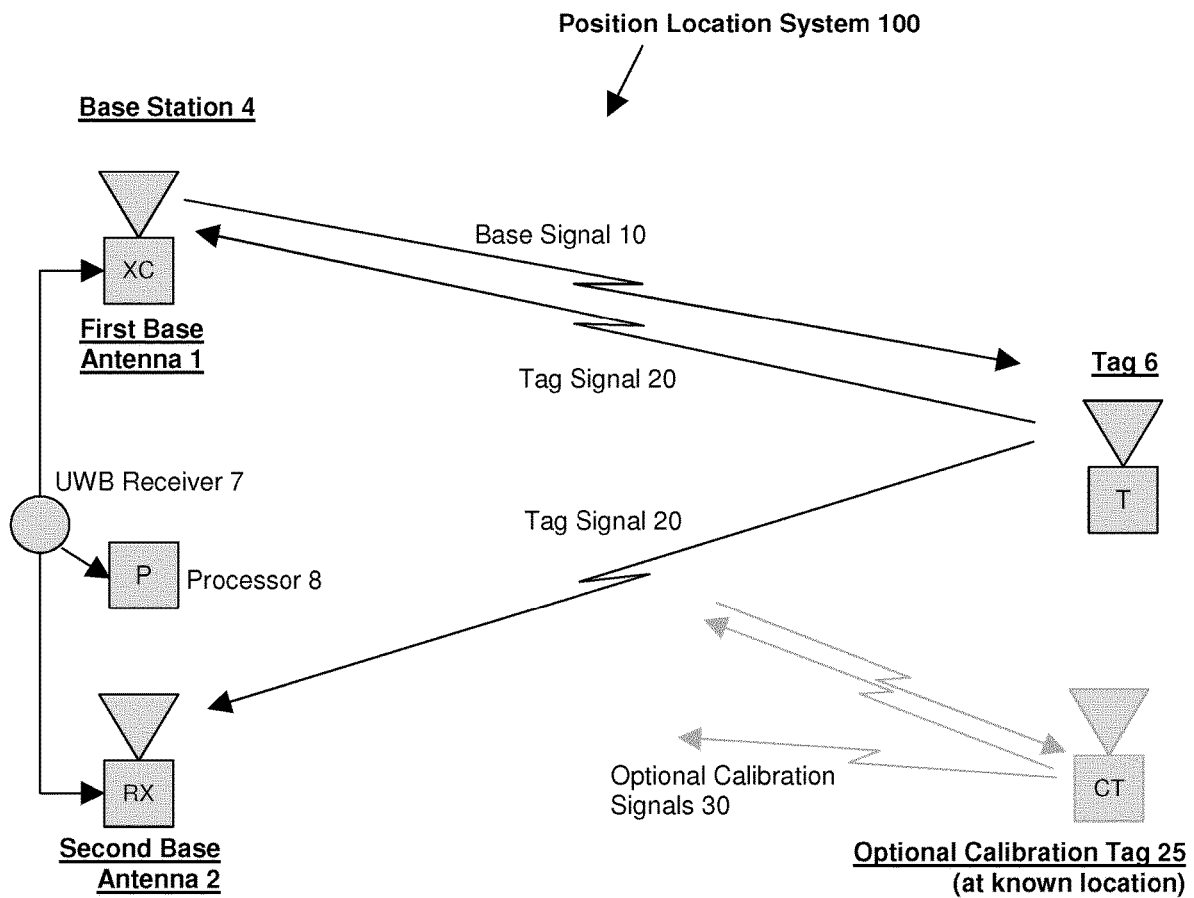
FIG. 1 illustrates an exemplary system for locating a position of a tag antenna relative to a plurality of base antennae, according to an embodiment of the present disclosure, and suitable for implementation of embodiments of the present inventive methods.

FIG. 1 illustrates an exemplary schematic view of a system 100 for location of a tag antenna 6 relative to a plurality of base antennae 1, 2, and which may desirably be suitable for implementation of embodiments of the present inventive methods. In one embodiment, system 100 comprises a plurality of spaced apart base antennae, such as but not limited to first base antenna 1 and second base antenna 2, which are both connected to an ultrawideband (UWB) receiver. The plurality of base antennae, including first base antenna 1 and second base antenna 2 may preferably comprise antenna elements suitable for receiving and transmitting UWB signals, such as pulsed UWB signals having sharply defined pulse durations about a central carrier wave frequency. The plurality of base antennae 1, 2 may comprise any desired UWB antenna element type such as may be known in the art. In one such embodiment, UWB receiver 7 may comprise a commercially available integrated UWB radio transceiver such as the DecaWave DW1000 available from DecaWave of Dublin, Ireland, for example, and base antennae 1, 2, may comprise commercially available integrated or standalone UWB antenna elements suitable for operation in connection with a chosen UWB radio receiver 7 for transmission/reception of UWB signals such as base signal 10/tag signal 20 on a desired carrier wave frequency, for example.

In a particular embodiment, first base antenna 1 and second base antenna 2 may comprise sparse antenna elements spaced apart at a spacing distance greater than a half wavelength of a carrier wave frequency of a UWB tag location signal 20 transmitted by the tag antenna 6. In one such embodiment, first base antenna 1 and second base antenna 2 may desirably also be spaced apart at a distance greater than a wavelength of a Nyquist sampling frequency for the UWB tag location signal 20, so as to desirably provide a sparse base antenna array and to desirably reduce the number of base antenna elements from those which would conventionally be required to provide a Nyquist spaced antenna array for a desired carrier frequency of the UWB tag location signal 20.

System 100 also comprises tag antenna 6 which may be attached to any object, person or other item the position of which is desired to be located and/or tracked relative to the base antennae 1, 2. Tag antenna 6 may desirably also comprise any suitable known antenna element and associated UWB radio transmitter and/or transceiver. In one exemplary embodiment, tag antenna 6 may also comprise a commercially available integrated UWB antenna/radio, such as the DW1000 UWB radio/antenna available from DecaWave of Dublin, Ireland, for example. In one embodiment, base antennae 1, 2, may desirably be kept stationary at a known location, such that the position of one or more tag antennae 6 may be located and tracked relative to the stationary base antennae 1, 2, to provide for location and tracking of the absolute position of the object or person to which the tag antenna 6 is attached, based on the known absolute position of the base antennae 1, 2, and the relative location of tag antenna 6 relative to the base antennae 1, 2, as determined using the system 100.

System 100 also comprises at least one processor 8 connected to the UWB receiver 7 which is connected to base antennae 1, 2. In one embodiment, processor 8 may comprise any suitable known processing means for executing computer-readable instructions to determine the position of the tag antenna 6 relative to the base antennae 1, 2 such as according to embodiments of the presently disclosed inventive methods, which may include is not limited to a general purpose computer processor (such as a general purpose CPU, system-on-chip, mobile computer, mobile device, or other general purpose processor), an application specific integrated circuit (ASIC) configured specifically for implementing position location methods according to embodiments of the disclosure, hybrid or software implemented processor, or virtualized, distribute or hardware independent processing engine or instance, for example. In a particular embodiment, processor 8 may be independent of UWB radio receiver 7. In an alternative embodiment, processor 8 may be integrated with UWB radio receiver 7, such as may be provided in an integrated UWB position location hardware solution, for example.

Figure 5:
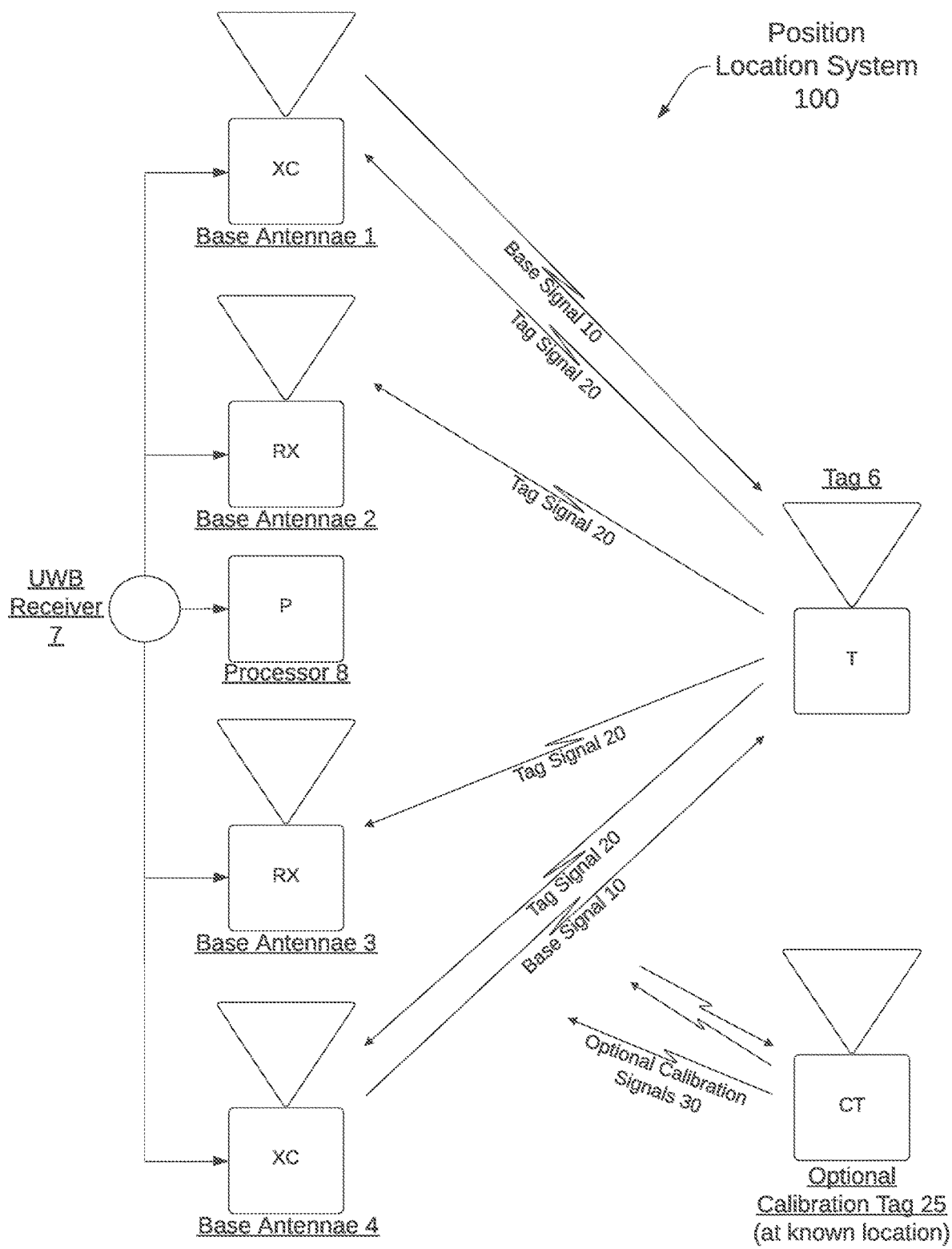
FIG. 5 illustrates an exemplary system for locating a position of a tag antenna relative to a plurality of base antennae arranged as two pairs of base antennae, according to an embodiment of the present disclosure, and suitable for implementation of embodiments of the present inventive methods.

In an optional embodiment, system 100 may additionally comprise at least one calibration tag antenna 20, which may desirably be suitable to transmit and/or receive UWB calibration signals 30 to and/or from the base antennae 1, 2, such as may be desirable to provide for calibration, adjustment and/or error correction data to UWB receiver 7. In one such optional embodiment, at least one calibration tag antenna 20 may be located at a known location, such that known UWB calibration signals 30 from/to the calibration antenna 20 may be received at base antennae 1, 2, and compared at receiver 7 and/or processor 8 over a period of time, such as to allow for calibration and/or correction of drift, bias, interference, multipath, and/or other potential factors which may be known to affect the accuracy and/or precision of UWB signals and their corresponding use for determining the relative position of tag antennae 6 by the system 100. In a further embodiment, system 100 may comprise two or more pairs of first and second base antennae, such as in an exemplary embodiment having 3 base antennae elements (third base antenna not shown in FIG. 1) configured to form two or three pairs of base antennae elements, or as in the exemplary embodiment illustrated in FIG. 5. In FIG. 5, base antennae elements 1, 2 form a first pair of base antennae and base antennae elements 3, 4 form a second pair of base antennae.

In one embodiment, system 100 may desirably provide for location of tag antenna 6 by means of determining an angle of arrival of tag signal 20 with respect to the base antennae 1, 2, which may be combined with a range of tag antenna 6 from the base antennae 1, 2 to calculate a relative position of tag antenna 6 with respect to base antennae 1, 2, such as recited according to aspects of the presently disclosed methods described in further detail below. In a particular embodiment, system 100 may be adapted for implementation of embodiments of the present inventive methods according to the disclosure which provide for using a differential time of arrival of tag signal 20 between base antennae 1 and 2 to determine a differential time angle of arrival, which may desirably be used in combination with a multi-lobe differential phase angle of arrival beam pattern calculated for the phase difference of arrival of tag signal 20 between base antennae 1, 2, such as to disambiguate the multi-lobe phase angle of arrival beam pattern, and provide for a desirably more precise disambiguated phase angle of arrival of the tag signal 20 relative to the base antennae 1, 2. Accordingly, in such an embodiment, system 100 may desirably provide for improved accuracy and precision for locating the position of tag antenna 6 relative to the base antennae 1, 2, than may be provided using time of arrival methods alone. In another embodiment, system 100 may desirably provide for use of a base antenna array having sparsely spaced base antennae 1, 2 which may be widely spaced relative to the wavelength of the UWB carrier wave signal such as to provide for greater position determination accuracy for a particular precision of time and/or phase differential measurement at the base antennae 1, 2.

In a further embodiment, base antennae 1, 2, may optionally also be configured to transmit a base signal 10 for reception by the tag antenna 6. In one such embodiment, base signal 10 may be used as a polling signal such as to initiate a response by tag antenna 6 by transmission of tag signal 20, for example. In another aspect, base signal 10 may be used in connection with tag signal 20 to provide for a round trip time of flight measurement for determining a range of tag antenna 6 relative to base antennae 1, 2, for example. In yet another aspect, base signal 10 may be used in conjunction with tag signal 20 and/or optionally also with calibration signal 30 to allow for synchronization of time measurements or to account for clock drift between tag antenna 6 and base antennae 1, 2, or to measure and/or calculate error or calibration data such as interference, reflection, multipath, distortion, attenuation or other factors involving the transmission of UWB signals by system 100.

Figure 2:
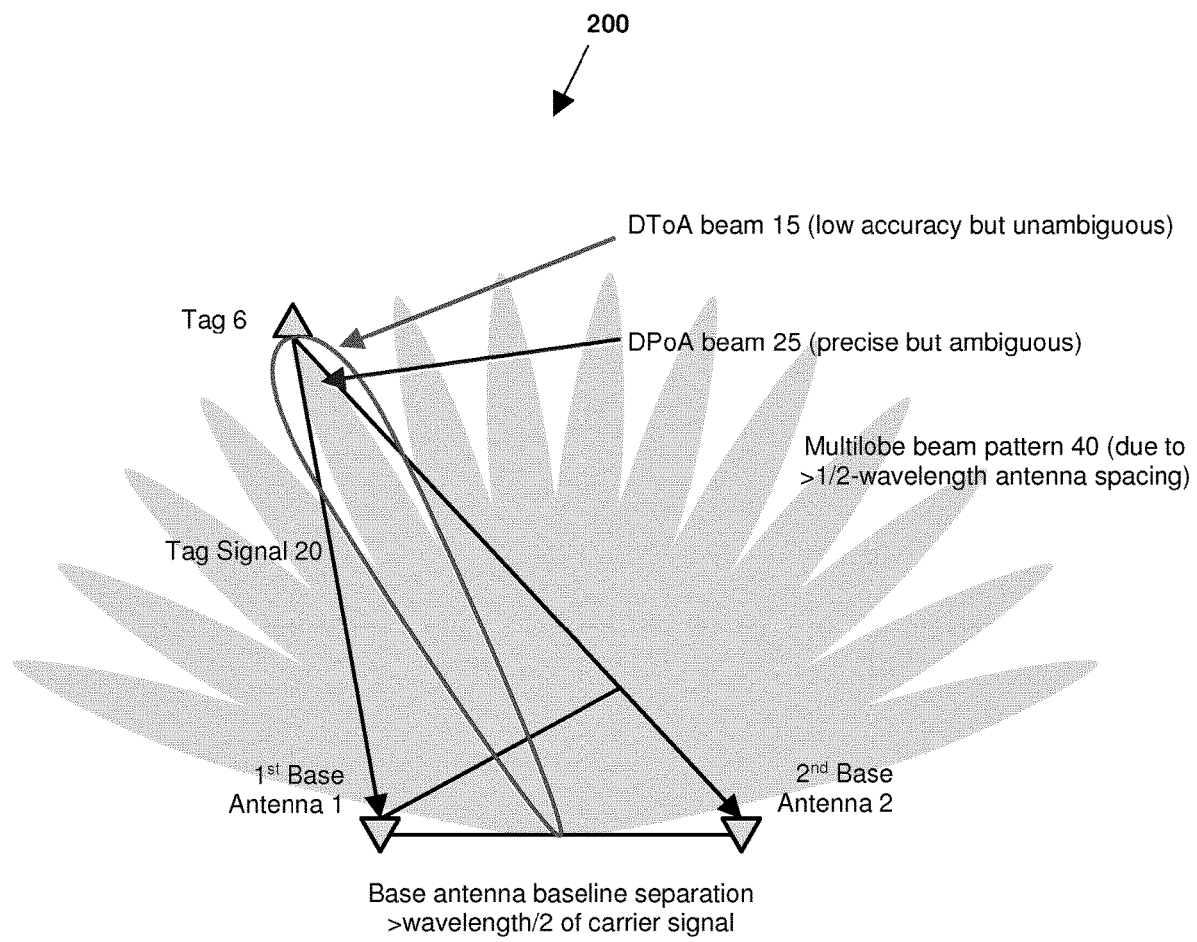
FIG. 2 illustrates a schematic diagram of a system for locating a position of a tag antenna relative to a plurality of base antennae showing an exemplary multi-lobe differential phase angle of arrival beam pattern and an exemplary differential time angle of arrival beam according to an embodiment of the present disclosure.

FIG. 2 illustrates a schematic diagram of a system 200 for locating a position of a tag antenna 6 relative to a plurality of base antennae 1, 2, showing an exemplary multi-lobe differential phase angle of arrival beam pattern 40, an exemplary differential time angle of arrival beam 15, and an individual unambiguous differential phase angle of approach beam 25, according to an embodiment of the present disclosure. In one embodiment, the system 200 may comprise tag antenna 6 which may transmit at least one UWB tag signal 20 which may be received by first and second base antennae 1, 2, which are spaced apart from each other to desirably form a sparse base antenna array. In one such embodiment, a phase difference of arrival of tag signal 20 between first base antenna 1 and second base antenna 2 may be measured and may desirably provide for calculation of a multi-lobe differential phase beam pattern 40, such as by a processor or integrated UWB receiver and processing means (not shown), similar to as shown and described above in reference to FIG. 1. In such an embodiment, multi-lobe differential phase beam pattern 40 may comprise multiple ambiguous individual lobes or differential phase angle of arrival beams 25 due to the spacing of the first and second base antennae 1, 2, in a sparse array.

In another aspect, a time difference of arrival of tag signal 20 between first base antenna 1 and second base antenna 2 may be measured and may desirably provide for calculation of a differential time angle of arrival beam 15 of tag signal 20 relative to base antennae 1 and 2. In an embodiment according to the present invention, this differential time angle of arrival beam 15 may desirably be used to disambiguate the multi-lobe differential phase beam pattern 40 and desirably to identify a single differential phase angle of arrival beam 25 which may be used to calculate a particular phase angle of arrival of the tag signal 20. In one such embodiment, the differential phase angle of arrival beam 25 may desirably provide for at least one of greater accuracy, precision, resolution and/or reduction of error in determining the angle of arrival of tag antenna 6 relative to base antennae 1, 2 than would be possible by use only of the differential time angle of arrival calculated by the differential time of arrival of tag signal 20 at base antenna 1, 2. Therefore, in one such embodiment, a position calculated for tag antenna 6 relative to base antennae 1, 2 by using a single unambiguous differential phase angle of arrival beam 25 and a range calculated by any suitable known UWB signal ranging technique (such as time of flight measurement, for example) may desirably provide at least one of greater position accuracy, precision, resolution and/or reduction of error in determining the location of tag antenna 6 relative to base antennae 1, 2 than would be possible by use only of the differential time angle of arrival calculated by the differential time of arrival of tag signal 20 at base antenna 1, 2 and a suitably calculated range.

In one exemplary embodiment, first base antenna 1 may be spaced 1 m from second base antenna 2, for use in an UWB position location 200 according to an embodiment of the invention where the UWB signal has a pulse bandwidth of 1 GHz, on a carrier wave frequency of 4 GHz. In this example, the separation of base antennae 1, 2 is approximately 13⅓ wavelengths of the 4 GHz carrier wave, and therefore represents a sparse base antenna array, with base antenna spacing of at least about 26 times greater than the ½ wavelength of the carrier wave signal, and therefore much greater than the Nyquist antenna element spacing that would be necessary to provide for unambiguous phase differential angle of arrival measurement directly from the tag signals 20 as they arrive at base antennae 1, 2. Such sparse spacing of base antennae 1, 2, may be desirable such as to improve precision of angle of arrival measurements calculated from differential time and/or phase of arrival, and to allow for a desirably simpler, more efficient and cost effective base antenna array comprising only two base antennae 1, 2, rather than the much greater number of base antennae which would be required to provide base antenna elements at a Nyquist or ½ wavelength maximum spacing, for example. In this example, conventional methods for measuring differential time of arrival of tag signal 20 between base antennae 1, 2 and for calculation of differential time angle of arrival of tag signal 20 having an exemplary pulse bandwidth of 1 GHz may desirably provide for a differential time angle of arrival beam 15 which is desirably accurate to within less than 3.75 cm (½ wavelength of 4 GHz carrier wave signal) so as to allow for disambiguation of the multi-lobe differential phase angle of arrival beam pattern 40 to provide for calculation of a differential phase angle of arrival of tag signal 20 at the peak of a single unambiguous differential phase angle of arrival beam 25. In such case, the differential phase angle of arrival calculated using beam 25 may desirably provide for more precise angle of arrival of tag signal 20 than using the differential time angle of arrival beam 15 alone, while allowing for use of a sparse base antenna array having only first and second base antennae 1, 2, spaced at multiples of the carrier wavelength, which may desirably provide for greater positional accuracy of tag antenna 6 when using differential phase angle of arrival from beam 25 with a range measurement according to any suitable UWB method for determining range.

FIG. 3 illustrates a schematic diagram of an exemplary ultrawideband (UWB) signal pulse according to an embodiment of the present disclosure, illustrating a UWB pulse duration T corresponding to a pulse bandwidth of 1/T of a carrier wave signal having frequency f. In the exemplary UWB signal pulse shown in FIG. 3, the pulse corresponds to approximately four periods of the carrier wave frequency f. In one embodiment according to the present invention, the UWB signal waveforms comprised in a tag signal 20 and to be received by base antennae 1, 2 for use in time of arrival and ranging measurement for position location purposes may be known by the receiver 7 and may typically not be modulated to carry data as in the case of communication waveforms. Accordingly, since the waveform of the UWB signal is known, in one embodiment a matched filter correlator may be used by receiver 7 such as to observe and measure time of arrival and time delay for phase differential measurement of received tag signals 20, for example.

Figure 3A:
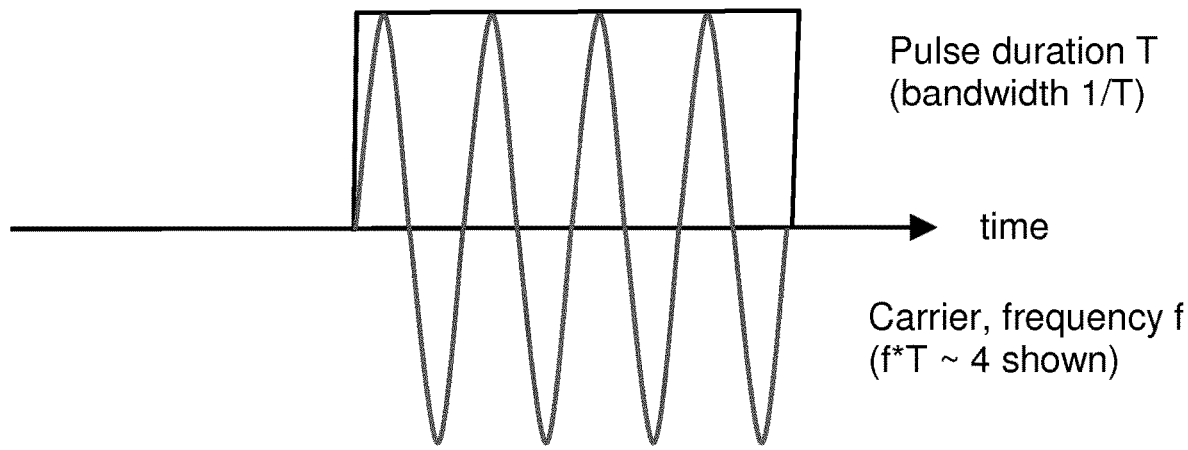
FIG. 3A illustrates a schematic diagram of an exemplary ultrawideband (UWB) signal pulse according to an embodiment of the present disclosure.
Figure 3B:
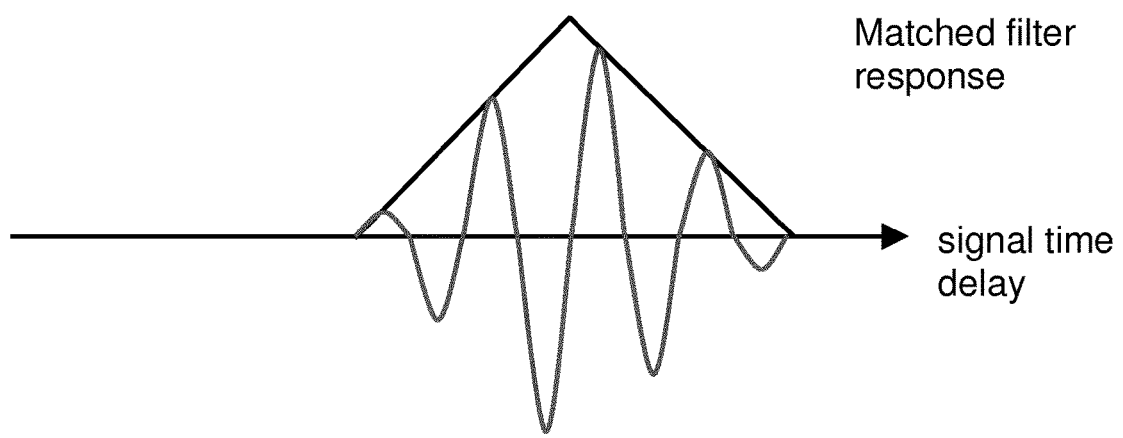
FIG. 3B illustrates a schematic diagram of an exemplary matched filter correlation response corresponding to the UWB signal pulse shown in FIG. 3A, according to an embodiment of the present disclosure.

FIG. 3B illustrates a schematic diagram of an exemplary matched filter correlation response corresponding to the UWB signal pulse shown in FIG. 3A, for such according to an embodiment of the invention. The matched filter correlation response illustrated in FIG. 3B indicates a substantially triangular correlation peak which may desirably be used such as by receiver 7 or processor 8 to measure time of arrival, such as by estimating the location of the correlation peak. In the exemplary embodiment illustrated in FIG. 3B, the correlation response from the matched filter correlator is shown as a function of signal time delay. In another embodiment, a matched filter correlator may be implemented, such as by receiver 7 or processor 8, to vary with time so as to output a channel response. However, as shown by the relatively gradual slope of the correlation peak illustrated in FIG. 3B, the estimation of time of arrival by estimation of the location of the correlation peak is sensitive to signal noise, and as noise increases, the time of arrival measurement typically becomes less accurate and less precise. Additionally, in some embodiments, time of arrival measurements are dependent on the pulse bandwidth or frequency of the ultrawideband pulse signals, which may typically have a lower frequency than the carrier wave frequency of the ultrawideband signal. In one such embodiment, the pulse bandwidth may typically be in the range of about 1 GHz for example, and the carrier wave frequency may typically be in the range of about 4 GHz for example.

Conversely, the change in phase measured over time as measured at a complex correlator such as by receiver 7, may in one embodiment desirably be much sharper and allow for more accurate and precise estimation of time delay of the signal arrival at base antennae 1, 2 in comparison to a time of arrival measurement based on the pulse bandwidth of the ultrawideband signal. However, such estimation of time delay by change in phase measured over time typically results in an ambiguous multiple measurement of time delay. For example in the exemplary embodiment shown in FIGS. 3A and 3B, a measurement of complex correlation phase will result in 4 ambiguous time delay values over the response window. However, in one embodiment, a measurement of time of arrival based on the estimated location of the correlation peak of the matched filter response shown in FIG. 3B differential phase of the received tag signal 20 may provide for a suitably accurate estimate of time delay so as to allow for disambiguation of the differential phase measurement so as to identify a single time delay value calculated from the phase measurement, which is desirably more accurate and precise than the correlation peak time of arrival measurement alone for use in determining angle of arrival of the tag signal 20.

In one such embodiment, the desirably more precise phase differential measured time of arrival, ToA,phase, may be expressed as:

$$\text{ToA,phase} = (\text{PoA} + \text{round}(\text{ToA.Pulse}/\text{carPeriod} - \text{PoA}))*\text{carPeriod},$$

where ToA.Pulse is the time of arrival determined from the matched filter envelope correlation peak, PoA is the phase of arrival measured at the complex correlator, carPeriod is the period of the carrier wave frequency in the same time units as ToA, and ToA.phase is determined from the single disambiguated time delay measurement which is identified by using the measured ToA.pulse.

In a further embodiment, differential measurements of time of arrival may desirably be used such as to overcome common mode errors in measurement, such as transmit carrier phase offset relative to the time offset, for example. In one such embodiment, differential measurements of time of arrival such as differential time delay estimates may typically be affected only by timing errors between antenna receivers, which in one embodiment may desirably be controlled locally, such as by selecting time and carrier frequency distribution at the receiver 7 and base antennae 1, 2. In such a case, any subsequent errors, such as timing errors, may desirably also be calibrated such as with a known calibration tag 25 and associated calibration transmitter and antenna element transmitting a known calibration signal 30, which may desirably allow determination of any remaining time and/or phase offsets. In one such embodiment, a calibration signal 30 may be received by at least one of base antennae 1, 2, and used to determine a correction such as a correction factor or compensation for at least one of a differential time and/or differential phase of tag signal 20 as received at base antennae 1, 2. In a further such embodiment, a calibration signal 30 from a calibration tag 25 located at a known location may also be used to determine a correction such as a correction factor or position compensation for a relative position of one or more tags 10 as calculated such as by receiver 7 and/or processor 9.

Figure 4:
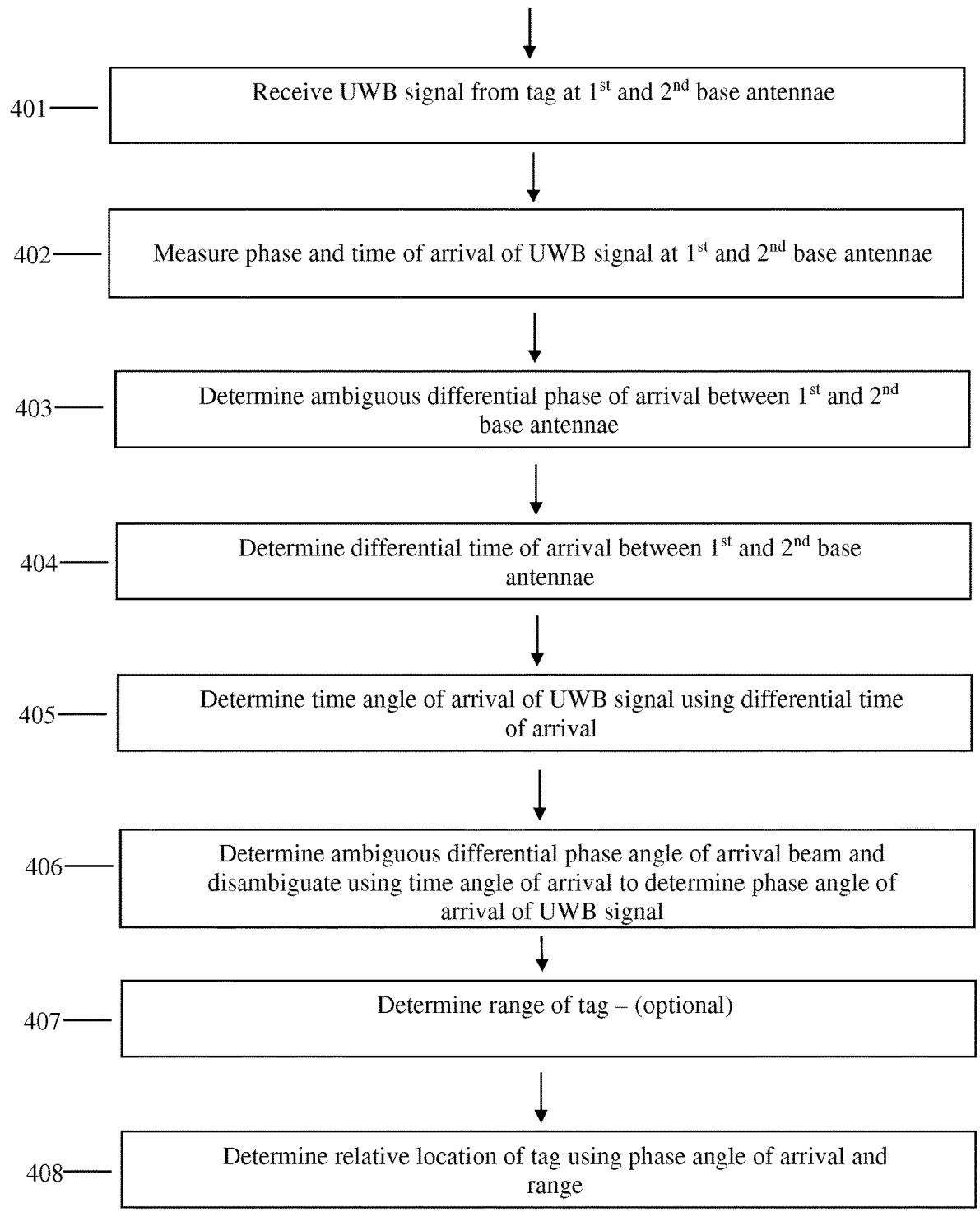
FIG. 4 illustrates an exemplary method for locating a position of a tag antenna relative to a plurality of base antennae, according to an embodiment of the disclosure.

FIG. 4 illustrates an exemplary method for locating a position of a tag antenna relative to a plurality of base antennae, according to an embodiment of the present disclosure. In one aspect, the exemplary method shown in FIG. 4 may be implemented by the system 100 illustrated in FIG. 1, and/or the exemplary schematic system 200 illustrated in FIG. 2. In one embodiment, the method comprises exemplary operations 401-408.

The first operation 401 of FIG. 4 comprises receiving a UWB tag signal 20 from tag antenna 6 at first and second base antennae 1, 2. In one embodiment, the first base antenna 1 and second base antenna 2 may desirably also be spaced apart at a distance greater than a wavelength of a Nyquist sampling frequency for the UWB tag location signal 20, so as to desirably provide a sparse base antenna array and to desirably reduce the number of base antenna elements from those which would conventionally be required to provide a Nyquist spaced antenna array for a desired carrier frequency of the UWB tag location signal 20. In another embodiment, base antennae 1, 2, may be connected to a base receiver 7, which may comprise any suitable UWB receiver/transceiver radio, such as an integrated USB radio system like the DW1000 available from DecaWave of Dublin, Ireland, for example.

The second operation 402 of FIG. 4 comprises measuring phase and time of arrival of the UWB tag signal 20 at the first and second base antennae 1, 2. In one embodiment, phase and time of arrival of the tag signal 20 at the first and second antennae 1, 2, may be made by any suitable known measurement techniques for measuring time and phase of arrival of UWB signals, such as for example the use of matched filter correlation to estimate a correlation peak for measurement of time of arrival, and complex correlation to estimate an arrival time delay for measurement of phase of arrival.

The third operation 403 of FIG. 4 comprises determining an ambiguous differential phase of arrival between the first and second base antennae 1, 2. In one embodiment, the ambiguous differential phase of arrival may be determined by differential comparison of the measured phase of arrival at the first and second base antennae 1, 2, respectively. In one such embodiment, a processor 8, such as a general purpose computer or application specific processor, which may be separate from or integrated with UWB receiver 7 may be used to determine the differential phase of arrival between the first and second base antennae 1, 2, such as by the exemplary calculations described above in relation to FIGS. 3A and 3B, or alternatively by any suitable known method for calculating differential phase of arrival of UWB signals.

The fourth operation 404 of FIG. 4 comprises determining a differential time of arrival between the first and second base antennae 1, 2. In one embodiment, the differential time of arrival may be determined by a differential comparison of the measured time of arrival at the first and second base antennae 1, 2, respectively. In one such embodiment, similar to as in operation 403 above, a processor 8, such as a general purpose computer or application specific processor, which may be separate from or integrated with UWB receiver 7 may be used to determine the differential time of arrival between the first and second base antennae 1, 2, such as by the exemplary calculations described above in relation to FIGS. 3A and 3B, or alternatively by any suitable known method for calculating differential time of arrival of UWB signals.

The fifth operation 405 of FIG. 4 comprises determining a time angle of arrival of the UWB tag signal 20 using the differential time of arrival. In one such embodiment, determining the time angle of arrival may comprise a calculation of angle of arrival of the tag signal 20 at the first and second base antennae 1, 2, based on the differential time of arrival determined in operation 404, and the known separation and orientation of first and second base antennae 1, 2. In another embodiment, in order to determine a convergent time angle of arrival solution, one or more prior assumptions may desirably be considered, such as prior constraint of possible locations of tag antenna 6 to locations within a known field, such as on the surface of the earth, or within other known geographical boundary limits for location of the tag antenna 6, for example.

The sixth operation 406 of FIG. 4 comprises determining an ambiguous differential phase angle of arrival beam 25, and disambiguating the differential phase angle or arrival beam 25 using the time angle of arrival to determine a phase angle of arrival of UWB tag signal 20. In one such embodiment, determining the differential phase angle of arrival may comprise a calculation of angle of arrival of the tag signal 20 at the first and second base antennae 1, 2, based on the differential phase time delay of arrival determined in operation 403, and the known separation and orientation of first and second base antennae 1, 2. In one such embodiment, the ambiguous differential phase angle of arrival beam 25 may comprise a multi-lobe beam such as described above in reference to FIG. 2, where the sinusoidal nature of the UWB carrier wave signal results in multiple ambiguous solutions for the differential phase angle of arrival of the tag signal 20 at first and second base antennae 1, 2. In one aspect, the time angle of arrival determined in operation 405 above, may desirably be sufficiently accurate and precise to provide for identification of a single solution of the differential phase angle of arrival, and thereby to disambiguate the differential phase angle of arrival beam 25 and determine a single phase angle of arrival of the tag signal 20.

The seventh operation 407 of FIG. 4 comprises optionally determining the range of tag antenna 6 from base antennae 1, 2. In one embodiment, a range from base antennae 1, 2, to tag antenna 6 may be determined by any suitable known method of ranging for application to UWB positioning. In one such case, a range of tag antenna 6 may be determined by a conventional two-way measurement of time of flight of UWB signals from one or more of base antennae 1, 2, to tag antenna 6, as may be known in the art. In another embodiment, the range to tag antenna 6 may be determined using a combination of differential phase and differential time methods according to an embodiment of the present invention. In one such embodiment, a flight time range may be determined using substantially conventional methods such as measuring round-trip flight time of base signal 10 to tag antenna 6, and tag signal 20 to base antennae 1, 2. In such UWB time of flight range calculation method, the round trip time measurement of two way signals may be used to desirably allow estimation of and correction for relative clock offset effects between the tag antenna 6 and base antennae 1, 2, to provide determination of a time of flight range value to tag antenna 6. In one optional embodiment of the invention, phase of arrival of tag signal 20 may also be measured at base antennae 1, 2, to determine desirably precise but wavelength-ambiguous phase of arrival range values for tag antenna 6 to base antennae 1, 2. In such cases where the time of flight range value is accurate to within a wavelength of the carrier wave signal, the time of flight range value may be used to disambiguate the phase of arrival range value and to unambiguously identify a particular wavelength of tag signal 20 arriving at the base antennae 1, 2, thereby providing for use of the desirably more precise disambiguated phase range value as the range to tag antenna 6 for use in locating the position of tag antenna 6.

In an alternative embodiment, a range to tag antenna 6 may be determined using an external technique or equipment, such as to provide a range independent of the UWB radio transmission of tag signal 20.

The eighth operation 408 of FIG. 4 comprises determining a relative location of tag antenna 6 using the phase angle of arrival and range. In one embodiment, the relative location of tag antenna 6 may be determined by using the phase angle of arrival and range to define a relative radial vector between the base antennae 1, 2, and the tag antenna 6. In a particular embodiment, where an absolute location and orientation of base antennae 1, 2 is known, an absolute location of tag antenna 6 may also be determined using the phase angle of arrival and range values to provide an absolute radial vector from the known base antennae 1, 2 to the tag antenna 6.

In a further embodiment of the present invention, operation 401 of the above method may be implicit, such that the reception of the UWB signal from tag antenna 6 is implied by the measurement of the phase and time of arrival of the UWB signal at the first and second base antennae 1, 2. In yet a further optional embodiment, a method for determining the position of a tag antenna relative to a plurality of spaced apart fixed base antennae may further comprise receiving a calibration signal 30 from one or more calibration tag 25, at at least one of base antennae 1, 2, and using the known calibration signal to determine a correction such as a correction factor or compensation for at least one of a differential time and/or differential phase of tag signal 20 as received at base antennae 1, 2. In a further such embodiment, a calibration signal 30 from a calibration tag 25 located at a known location may also be used to determine a correction such as a correction factor or compensation for a relative position of one or more tags 10 as calculated such as by receiver 7 and/or processor 9.

In a further embodiment, a method for determining the location of the tag antenna may comprise operations comprising: determining a three dimensional (or 3D) location of the tag antenna relative to each of two or more pairs of first and second base antennae, using the phase angle of arrival and range of the tag antenna determined (such as by operations 401 to 407 of the method of FIG. 4, for example) for each of the two or more pairs of first and second base antennae. In an exemplary such embodiment, three base antennae elements may be used in combination, such as configured as two or three pairs of antenna elements, to determine location in three dimensions (3D) of the tag antenna using the phase angle of arrival and range of the tag antenna for each of the two or three pairs of antenna elements. In a particular such embodiment, 4 or more base antenna elements may be configured as more than three pairs of antenna elements, such as to provide for an over-determination of three dimensional location, which may optionally allow for improved location determination such as by use of measurement averaging and/or detection and removal of bad or suspect measurements by one or more suitable error correction techniques, such as RAIM (receiver autonomous integrity monitoring) techniques, for example. In yet another embodiment, determining the location of the tag antenna may comprise determining an aggregation or average of a plurality of determined locations using the phase angle of arrival and range for each of the two or more respective pairs of base antennae.

It will be appreciated that the functions depicted and described herein may be implemented in software such as by virtualization or software implemented signal processing, or a combination of software and hardware, e.g., using a general purpose computer, via execution of software on a general purpose computer so as to provide a special purpose computer, using one or more application specific integrated circuits (ASICs) or any other hardware equivalents, or the like, as well as various combinations thereof.

It will be appreciated that at least some of the methods discussed herein may be implemented within software, or a combination of software and hardware, for example, as circuitry that cooperates with the processor to perform various method steps. Portions of the functions/elements described herein may be implemented as a computer program product wherein computer instructions, when processed by a computer, adapt the operation of the computer such that the methods or techniques described herein are invoked or otherwise provided. Instructions for invoking the inventive methods may be stored in fixed or removable media, transmitted via a data stream in a broadcast or other signal bearing medium, or stored within a memory within a computing device operating according to the instructions.

While the present invention and its various functional components and operational functions have been described in particular exemplary embodiments, the invention may also be implemented in hardware, software, firmware, middleware or a combination thereof and utilized in systems, subsystems, components or subcomponents thereof. In particular embodiments implemented in software, elements of the present invention may be instructions and/or code segments to perform the necessary tasks. The program or code segments may be stored in a machine readable medium, such as a processor readable, such as a processor readable medium or a computer program product, or transmitted by a computer data signal embodied in a carrier wave, or a signal modulated by a carrier, over a transmission medium or communication link. The machine readable medium or processor readable medium may include any medium that can store or transfer information in a form readable and executable by a machine, for example a processor, computer, etc.

It will be appreciated that the term "or" as used herein refers to a non-exclusive "or" unless otherwise indicated (e.g., use of "or else" or "or in the alternative").

An embodiment of the present invention relates to a computer storage product with a non-transitory computer-readable medium having computer code thereon for performing various computer-implemented operations. The computer-readable media and computer code may be those specially designed and constructed for the purposes of the present invention, or they may be of the kind well known and available to those having skill in the computer software arts. Examples of computer-readable media include, but are not limited to: programmable logic devices ("PLDs") and ROM and RAM devices including Flash RAM memory storage cards, sticks and chips, for example magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs), for example. Examples of computer code include machine code, such as produced by a compiler, and files containing higher-level code that are executed by a computer using an interpreter. For example, an embodiment of the invention may be implemented using HTML5, XML, JavaScript, Java, C#, C++, Objective C, or any other suitable known scripting, markup and/or programming languages and development tools. Another embodiment of the invention may be implemented in hardwired circuitry in place of, or in combination with, machine-executable software instructions.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the claims.

What is claimed is:

1. A system for determining a position of a tag antenna, comprising:
   a first pair of spaced apart fixed base antennae including two antennae; and
   a second pair of spaced apart fixed base antennae including two antennae, wherein at least one base antenna of the first pair of base antennae and at least one base antenna of the second pair of base antennae are separated by a spacing distance between one-half wavelength of the carrier wave of an ultrawideband signal and 1 meter;

an ultrawideband receiver connected to the first and second pairs of base antennae and configured to receive an ultrawideband signal from the tag antenna from each of the first and second pairs of base antennae; and a processor connected to the ultrawideband receiver and configured to:
  measure a phase of arrival and a time of arrival of an ultrawideband signal at each of the antennae of the first and second pairs of base antennae
  determine a differential phase of arrival of the ultrawideband signal between the two antennae of the first pair of base antennae and between the two antennae of the second pair of base antennae using the phase of arrival;
  determine a differential time of arrival of the ultrawideband signal between the two antennae of the first pair of base antennae and between the two antennae of the second pair of base antennae using the time of arrival;
  determine a differential time angle of arrival of the ultrawideband signal relative to each of the first pair of base antennae and the second pair of base antennae using the differential time of arrival;
  determine an ambiguous differential phase angle of arrival beam for each of the first and second pairs of the base antennae;
  disambiguate each differential phase angle of arrival beam using the differential time angle of arrival for the respective antennae pair to determine a phase angle of arrival of the ultrawideband signal for each of the first and second pairs of base antennae; and
  determine the position of the tag antenna in three dimensional space relative to the first and second pairs of base antennae using the phase angle of arrival for each of the first and second pairs of base antennae and a range of the tag antenna for each of the antennae of the first and second pairs of base antennae.

2. The system according to claim 1, wherein the first pair of base antennae includes a first base antenna having a first antenna element and a second antenna having a second antenna element spaced apart from said first antenna element; and the second pair of base antennae includes a third antenna comprising a third antenna element and a fourth antenna element spaced apart from said third antenna element.

3. The system according to claim 1, wherein the first pair of base antennae includes a first base antenna having a first antenna element and a second antenna having a second antenna element spaced apart from said first antenna element; and the second pair of base antennae includes the second antenna and a third antenna having a third antenna element spaced apart from said second antenna element.

4. The system according to claim 1, wherein the first and second pairs of base antennae are spaced greater than a distance of one half wavelength of a carrier wave of the ultrawideband signal.

5. The system according to claim 4, wherein the carrier wave frequency is 4 GHz.

6. The system according to claim 1 wherein each pair of base antennae comprise a sparse antenna array.

7. The system according to claim 1, wherein said processor is configured to determine the position of the tag antenna relative to the first and second pairs of base antennae using the determined phase angles of arrival and the ranges of the tag antenna to each of the antennae of the first and second pairs of spaced apart fixed base antennae.

8. The system according to claim 1, wherein determining the range of the tag antenna from at least one base antenna of the first and second pairs of base antennae comprises measuring a round trip time of flight of an ultrawideband signal between the tag antenna and at least one base antenna.

9. The system according to claim 1, wherein measuring the time of arrival and the phase of arrival of the ultrawideband signal comprises using a matched filter correlation to determine the measured time of arrival of the ultrawideband signal.

10. The system according to claim 1, wherein disambiguating the differential phase angle of arrival beam using the time angle of arrival includes using a Gaussian probability model to disambiguate the differential phase angle of arrival and determine the phase angle of arrival of the ultrawideband signal.

11. A method for determining a position of a tag antenna relative to a first pair of spaced apart fixed base antennae including two antennae and a second pair of spaced apart fixed base antennae including two antennae, wherein at least one base antenna of the first pair of base antennae and at least one base antenna of the second pair of base antennae are separated by a spacing distance between one-half wavelength of the carrier wave of an ultrawideband signal and 1 meter, the method comprising:
  measuring a phase of arrival and a time of arrival of an ultrawideband signal at each of the antennae of the first and second pairs of base antennae;
  determining a differential phase of arrival of the ultrawideband signal between the two antennae of the first pair of base antennae and between the two antennae of the second pair of base antennae using the phase of arrival;
  determining a differential time of arrival of the ultrawideband signal for between the two antennae of the first pair of base antennae and between the two antennae of the second pair of base antennae using the time of arrival;
  determining a differential time angle of arrival of the ultrawideband signal relative to each of the first pair of base antennae and the second pair of base antennae using the differential time of arrival;
  determining an ambiguous differential phase angle of arrival beam for each of the first and second pairs of the base antennae;
  disambiguating each differential phase angle of arrival beam using the differential time angle of arrival for the respective antennae pair to determine a phase angle of arrival of the ultrawideband signal for each of the first and second pairs of the base antennae; and
  determining the position of the tag antenna in three dimensional space relative to the first and second pairs of base antennae using the phase angle of arrival for each of the first and second pairs of base antennae and a range of the tag antenna for each of the antennae of the first and second pairs of base antennae.

12. The method according to claim 11, wherein one of the first and second base antennae pairs are spaced greater than a distance of one half wavelength of a carrier wave of the ultrawideband signal.

13. The method according to claim 11, wherein the ambiguous differential phase angle of arrival comprises an ambiguous beam comprising multiple lobes.

14. The method according to claim 11, further comprising:
   determining the range of the tag antenna from at least one base antenna of one of the first pair of base antennae and the second pair of base antennae by measuring a round trip time of flight of an ultrawideband signal between the tag antenna and the at least one base antenna.

15. The method according to claim 11, wherein measuring the time of arrival and the phase of arrival of the ultrawideband signal comprises using a matched filter correlation to determine the measured time of arrival of the ultrawideband signal.

16. The method according to claim 15, wherein measuring the phase of arrival of the ultrawideband signal comprises measuring a time delay of the signal using the matched filter correlation to determine the measured phase of arrival of the ultrawideband signal.

17. The method according to claim 11, wherein each of the first and second pairs of base antennae are spaced apart at greater than a Nyquist spacing for a carrier wave frequency of the ultrawideband signal.

18. The method according to claim 11, wherein disambiguating the differential phase angle of arrival beam using the time angle of arrival additionally includes using a Gaussian probability model to disambiguate the differential phase angle of arrival and determine the phase angle of arrival of the ultrawideband signal.

19. The method according to claim 11, wherein the first and second pairs of base antennae each comprise a sparse antenna array.

20. The method according to claim 11, wherein the first pair of base antennae includes a first base antenna having a first antenna element and a second antenna having a second antenna element spaced apart from said first antenna element; and the second pair of base antennae includes a third antenna comprising a third antenna element and a fourth antenna element spaced apart from said third antenna element.

21. The method according to claim 11, wherein the first pair of base antennae includes a first base antenna having a first antenna element and a second antenna having a second antenna element spaced apart from said first antenna element; and the second pair of base antennae includes the second antenna and a third antenna having a third antenna element spaced apart from said second antenna element.

* * * * *